United States Patent [19]
Allan et al.

[11] Patent Number: 5,870,475
[45] Date of Patent: Feb. 9, 1999

[54] FACILITATING SECURE COMMUNICATIONS IN A DISTRIBUTION NETWORK

[75] Inventors: David I. Allan; Liam M. Casey; Adrian D. Jones, all of Ottawa, Canada

[73] Assignee: Northern Telecom Limited, Montreal, Canada

[21] Appl. No.: 588,848

[22] Filed: Jan. 19, 1996

[51] Int. Cl.⁶ .................................................. H04L 9/00
[52] U.S. Cl. ................................ 380/21; 380/23; 380/49
[58] Field of Search ..................... 398/187.01; 380/21, 380/49, 23, 25, 30, 18

[56] References Cited

U.S. PATENT DOCUMENTS

| | | | |
|---|---|---|---|
| 4,453,074 | 6/1984 | Weinstein | 380/23 |
| 4,484,025 | 11/1984 | Ostermann et al. | 380/21 |
| 4,723,284 | 2/1988 | Munck et al. | 380/25 |
| 5,179,591 | 1/1993 | Hardy et al. | 380/21 |
| 5,204,961 | 4/1993 | Barlow | 380/25 X |
| 5,386,468 | 1/1995 | Akiyama et al. | 380/25 |
| 5,408,259 | 4/1995 | Warwick | 348/6 |
| 5,497,420 | 3/1996 | Garneau et al. | 380/20 |
| 5,548,721 | 8/1996 | Denslow | 395/187.01 |
| 5,563,948 | 10/1996 | Diehl et al. | 380/16 |
| 5,671,285 | 9/1997 | Newman | 380/30 |

OTHER PUBLICATIONS

Bruce Shneier, "Applied Cryptology: Protocols, Algorithms, and Source Code in C", 1st edition John Wiley and Sons, N.Y. (1992).

*Primary Examiner*—Gail O. Hayes
*Assistant Examiner*—Pincuus M. Laufer
*Attorney, Agent, or Firm*—R. John Haley

[57] ABSTRACT

In a hybrid fiber-coax distribution network, communications between a central station and particular end stations are encrypted using a working key (WK) of a symmetric encryption scheme. The central station has a public and private key (PPK) of a PPK encryption scheme, and some of the end stations can also each have a respective PPK. To provide secure communications for each end station, if the end station has a PPK, then the respective WK is generated in the central station and communicated, encrypted using the end station's public key (PK), to the end station. Otherwise, the WK is generated in the end station and communicated, encrypted using the central station's PK, to the central station. An individual identifier for each end station, and a cryptographic signature at least for end stations not having a PPK, can be communicated to the central station for authentication of the end stations.

14 Claims, 3 Drawing Sheets

FACILITATING SECURE COMMUNICATIONS IN A DISTRIBUTION NETWORK

This invention relates to methods of facilitating secure communications in a distribution network, such as for example a coaxial cable or hybrid fiber-coax (HFC) network.

BACKGROUND OF THE INVENTION

A distribution network, such as an HFC network in which data is communicated to subscriber end stations via optical fiber and coaxial distribution cables, is a point-to-multipoint network in which data addressed to and intended for any particular subscriber is also inevitably supplied via the network to other subscribers. If the data is not scrambled or encrypted, it can be easily monitored by these other subscribers, leading to a loss of subscriber privacy and a loss of revenues for data suppliers when the data (e.g. television programs) is supplied for a fee. Accordingly, it is important to provide a desired level of security in the data communications in a distribution network.

While various encryption and decryption schemes are known, these have a number of disadvantages associated with them in the environment of a distribution network. A significant factor in this respect is the cost and security of subscriber end stations. As a distribution network will contain large numbers of subscriber end stations, it is commercially necessary that the cost of each end station be kept relatively low. It is therefore desirable to avoid incorporating expensive security schemes in the subscriber end stations. However, subscriber end stations are also easily subject to theft, tampering, and duplication, so that complicated schemes have been considered necessary to provide adequate security.

For example, a security scheme can be implemented using an encryption key which can be stored in the subscriber end station. To prevent access to the encryption key, the store in the subscriber end station, and data lines to and from this store, must also be made physically secure. This leads to extra complexity and costs. Different subscribers may have differing security and privacy needs, which makes it desirable for the network to accommodate differing security schemes and end station costs.

A further security-related desirable aspect of a distribution network is an ability for authentication of subscriber end stations, typically using a unique end station identity which can be physically incorporated (e.g. hard wired) into the end station during manufacture.

Encryption schemes can be divided into those involving public and private keys (PPK) and those involving symmetric keys. In PPK schemes, a first station can distribute its public key, in accordance with which a second station can encrypt data and send the encrypted data to the first station, which decrypts the data using its private key. Because the private key is retained at the first station, and is not practically discoverable by other parties, PPK schemes are considered to be secure. However, the encryption and decryption processes are relatively slow, so that such schemes are not practical for encryption of real-time high-speed data, such as television program signals, for which distribution networks are primarily intended.

In symmetric key schemes, a single key, referred to as a working key, is used by both of first and second stations to encrypt and decrypt data being communicated between the stations. The nature of the working key is such that encryption of real-time highspeed data, such as television program signals, is practical. However, these schemes require that the working key be present in both stations, and make it desirable for the working key to be periodically changed or updated. Thus symmetric key schemes require generation of a working key in one of the stations or in a third station referred to as a key distribution agent, and communication of the working key to the other station(s).

This communication itself presents a risk of the working key being insecure, and this risk increases with the frequency with which the working key is updated. It is also known to avoid this risk by using a PPK scheme for communication of a working key, and then to use the working key for data encryption.

An object of this invention is to provide a method of facilitating secure communications in a distribution network.

SUMMARY OF THE INVENTION

This invention provides a method of facilitating secure communications using encryption and decryption processes in a distribution network comprising a central station and a plurality of addressable end stations, in which communications from the central station addressed to and intended for a particular end station are delivered via the network to a plurality of end stations, wherein the central station has, and one or more of the end stations can each have, a respective public and private key (PPK) of a PPK encryption scheme, comprising the steps of:

(a) determining in communications between the central station and an end station whether the end station has a PPK, if so proceeding with step (b) and if not proceeding with step (c);

(b) at the central station, determining the public key (PK) of the end station, generating a working key (WK) for encryption of communications to the end station, encrypting the WK using the PK of the end station, and communicating the encrypted WK to the end station; at the end station, decrypting the WK using the private key of the end station; and proceeding with step (d);

(c) at the end station, determining the public key (PK) of the central station, generating a working key (WK) for encryption of communications to the central station, encrypting the WK using the PK of the central station, and communicating the encrypted WK to the central station; at the central station, decrypting the WK using the private key of the central station; and proceeding with step (d);

(d) using the WK to encrypt at the central station, and to decrypt at the end station, communications from the central station to the end station.

BRIEF DESCRIPTION OF THE DRAWINGS

The invention will be further understood from the following description with reference to the accompanying drawings, in which.

DETAILED DESCRIPTION

The invention is described below in the context of a hybrid fiber-coax (HFC) distribution network in which signals are distributed from a central station or head end (HE) to a large number of subscriber end stations (ES) via optical fibers and coaxial cables in known manner. An example of such a network is described in Warwick U.S. Pat. No. 5,408,259 issued Apr. 18, 1995 and entitled "Data Modulation Arrangement For Selectively Distributing Data". Typically in such a network digital data communications are provided between any ES and the HE using asynchronous transfer mode (ATM) cells which are communicated in both directions, i.e. downstream from the HE to the ES and upstream from the ES to the HE, using suitable modulation schemes and carrier frequencies outside the bands used for analog television signals also carried on the coaxial cables. However, it is observed that the invention is equally applicable to other forms of distribution network.

Figure 1:
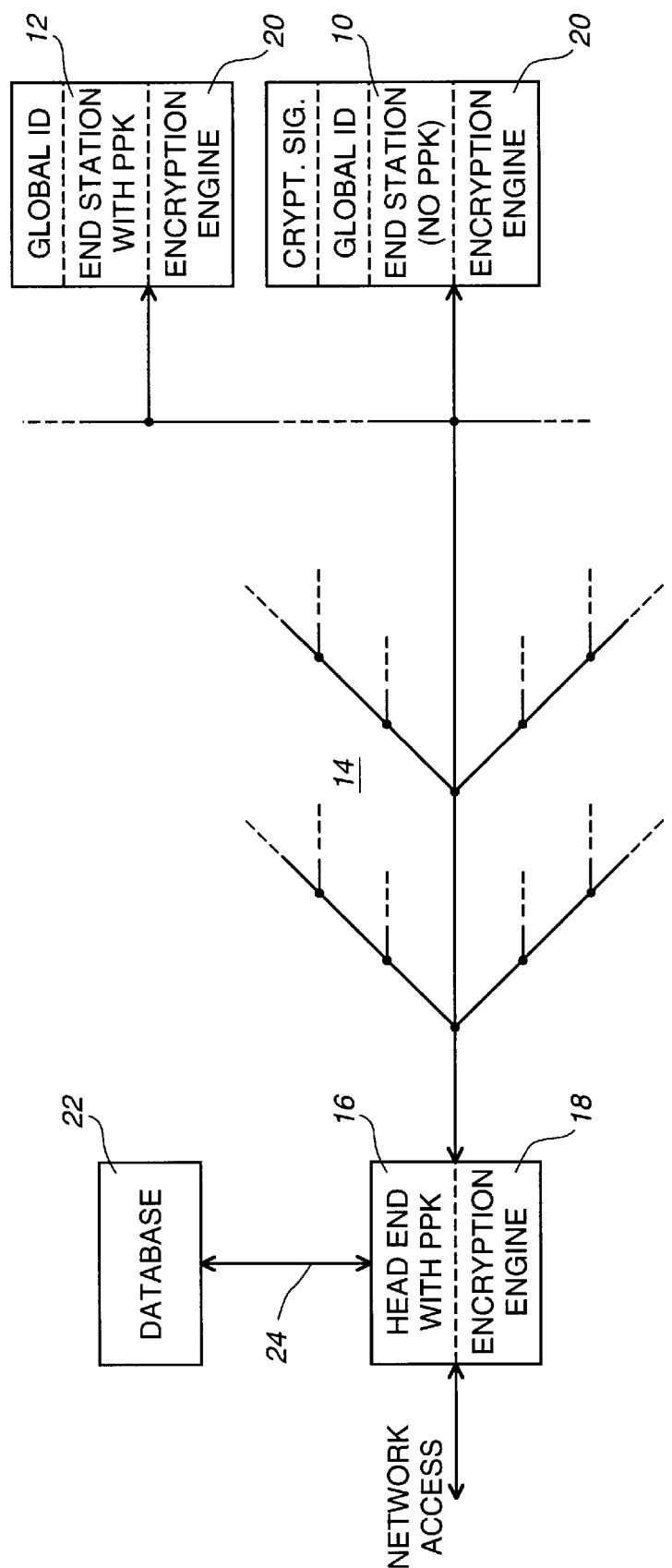
FIG. 1 illustrates parts of a distribution network to which the invention is applied.

Referring to FIG. 1, there is illustrated parts of a distribution network in which many end stations, only two of which are shown and are referenced 10 and 12, are connected via branched cables 14 of the distribution network to a head end 16, via which the end stations have access to a network (not shown) which for example supplies digital television program signals subscribed to by end station subscribers. The cables 14 can comprise both optical fiber and coaxial cables forming a hybrid fiber-coax arrangement, on which the digital signals can be communicated in known manner using ATM cells.

As can be appreciated from the illustration in FIG. 1, signals communicated by the head end 16 and intended for any particular end station will actually be delivered via the cables 14 to all of the end stations. For secure and/or private communication of the signals, the head end 16 includes an encryption engine 18 which encrypts the signals in accordance with a working key known only by the head end and the intended end station, which also includes an encryption engine 20 which decrypts the signals for use. These working keys are similarly used for communications in the opposite direction, from the end station to the head end 14. The working keys of this symmetric key encryption scheme are provided in the head end and the end station in a manner which is described in detail below.

The end stations 10 and 12 are of two types, with differing levels of security to enable different security needs of subscribers to be accommodated. The end station 12 represents a relatively secure end station, which includes its own public and private keys of a PPK encryption scheme. As explained in the introduction, such an end station has a relatively high complexity and cost, because of the need for secure storage of the keys and operation of the PPK encryption. Other end stations, which do not have their own public and private keys and accordingly can be provided at a much lower cost, are represented by the end station 10. The network as a whole may have an arbitrary mix of these two types of end station.

Each end station 10 or 12 also has an individual, unique identity number, which is stored (e.g. hard wired) into the ES during its manufacture. This is referred to as a global ID (identity). The global IDs of all of the end stations are stored in a database 22, which can be located with the head end 16 or separately from it and with which the head end 16 communicates via a path 24. The head end 16 also has its own public and private keys of a PPK encryption scheme.

Figure 2:
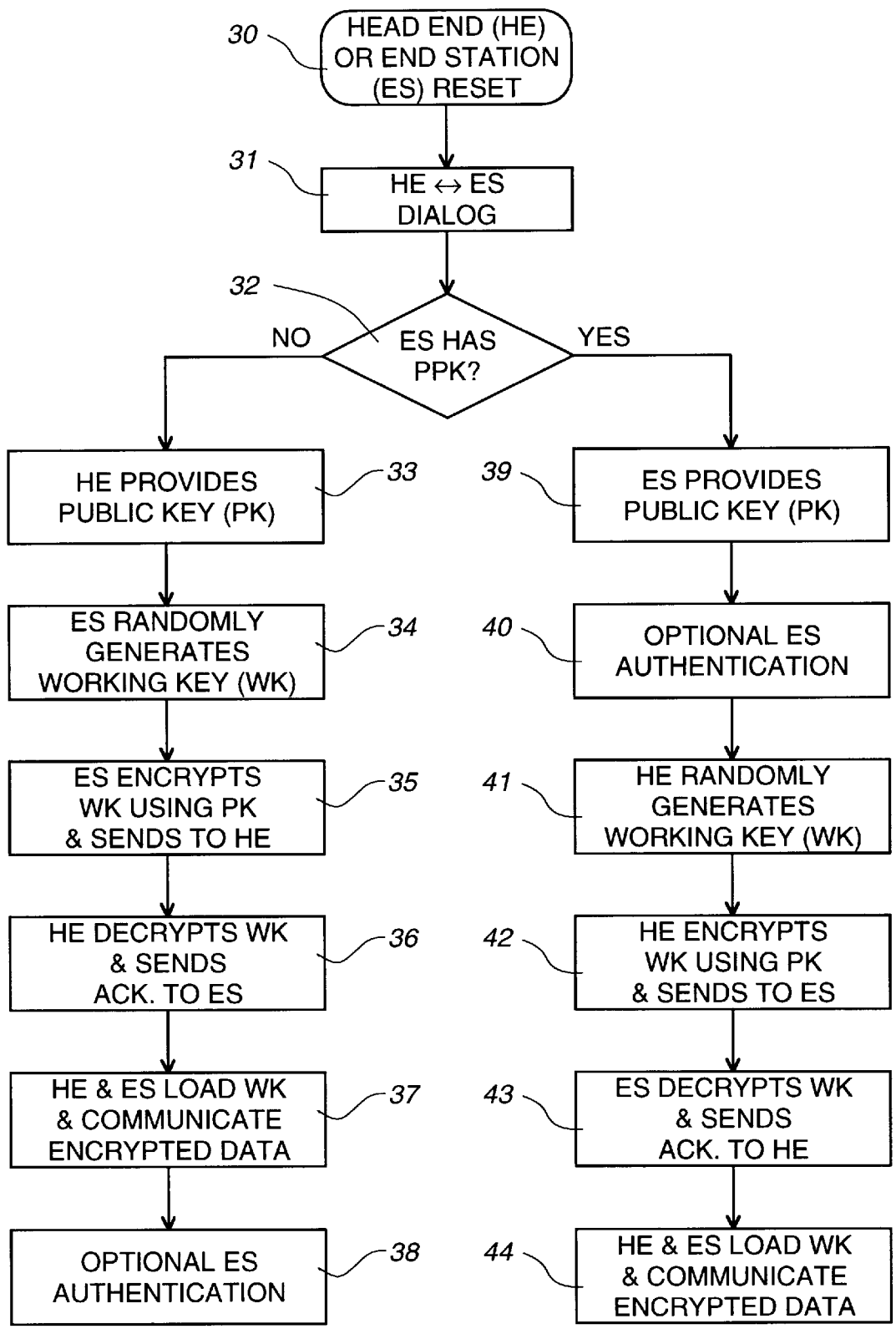
FIG. 2 is a flow chart illustrating steps of a method for facilitating secure communications in the network in accordance with the invention.

FIG. 2 shows steps of a process which is followed in order to set up secure communications between the head end 16 and one of the end stations 10 or 12. This process takes place between the head end and the respective end station without involvement of any other node such as a central key distribution agent, and is described below as being initiated in each case following any reset (e.g. following a power-up) of either the head end 16 or the respective end station. Consequently, the working key which is used for encrypting the communications between the head end and the end station is changed on any reset. However, the same process can alternatively or additionally be carried out on demand, and/or periodically to provide periodic changes of the working key. It is also observed that the encrypted communications take place between the encryption engines 18 in the head end 16 and 20 in the respective end station 10 or 12, and communications on the network access side of the head end 16 are not subject to the same encryption.

In FIG. 2, a block 30 represents a reset of the head end (HE) or end station (ES), in response to which, as shown by a block 31 in FIG. 2, a dialog or handshake is carried out between the HE and the ES to establish communications between them. These communications are effected using unencrypted ATM cells using addresses of the end station and the head end. As a part of this dialog, as shown by a block 32 in FIG. 2 the head end 16 interrogates the end station to determine whether or not the end station has its own public and private keys. If not, i.e. if the end station is an end station 10 as described above, then the process continues with successive blocks 33 to 38 in FIG. 2. If the interrogation establishes that the end station is an end station 12 having its own public and private keys, then the process instead continues with blocks 39 to 44 in FIG. 2.

In the former case of an end station 10, as shown by the block 33 the head end 16 communicates its public key (PK) to the end station 10; this communication can form part of the dialog block 31. The end station 10 randomly generates (block 34) a working key (WK) for communicating signals in a symmetric key encryption scheme, and encrypts (block 35) this working key in accordance with the supplied public key, sending the encrypted working key in a message to the head end 16. The head end 16 decrypts (block 36) the encrypted working key from this message in accordance with its private key, which is not known to others so that the communication of the working key from the end station 10 to the head end 16 is secure, and optionally but preferably sends an acknowledgement to the end station 10. As shown by the block 37, the head end 16 and the end station 10 then load their encryption engines 18 and 20 respectively with the working key, and thereafter (until this process is repeated, for example in response to a subsequent reset at either end) communications between them take place with data encrypted in accordance with the working key. An optional additional step represented by the block 38 provides for authentication of the end station 10 in a manner described below, with reference to FIG. 4.

Conversely, in the latter case of an end station 12, as shown by the block 39 the end station 12 communicates its public key (PK) to the head end 16; this communication can form part of the dialog block 31. An optional authentication step for the end station 12 can be carried out by the head end 16 as represented by the block 40 in a manner described below, with reference to FIG. 3. The head end 16 randomly generates (block 41) a working key (WK) for communicating signals in a symmetric key encryption scheme, and encrypts (block 42) this working key in accordance with the supplied public key of the end station 12, sending the encrypted working key in a message to the end station 12. The end station 12 decrypts (block 43) the encrypted working key from this message in accordance with its private key, which is not known to others so that the communication of the working key from the head end 16 to the end station 12 is secure, and optionally but preferably sends an acknowledgement to the head end 18. As shown by the block 44, the head end 16 and the end station 12 then load their encryption engines 18 and 20 respectively with the working key, and thereafter (until this process is repeated, for example in response to a subsequent reset at either end) communications between them take place with data encrypted in accordance with the working key.

It can be seen from the above description that, in the relatively secure but more expensive situation in which the end station 12 includes its own public and private keys, these are used for communicating a working key generated in the head end, whereas in the other case the end station 10 generates the working key and this is communicated to the head end using the latter's public key.

The optional step of authentication of the end station 12 in the block 40 as described above can make use of the global ID of the end station 12 together with data in the database 22, in which the public key of the end station 12 is stored in association with this global ID. As part of the dialog block 31, the end station communicates its global ID to the head end 16. In the step 40, therefore, the head end 16 can communicate via the path 24 with the database 22 to confirm that the public key which it has received from the end station 12 in the step 39 matches that stored in the database 22 for this end station's global ID, the subsequent steps 41 to 44 only being followed if this authentication step is successful. This verification is illustrated by a block 50 in FIG. 3.

Figures 3, 4:
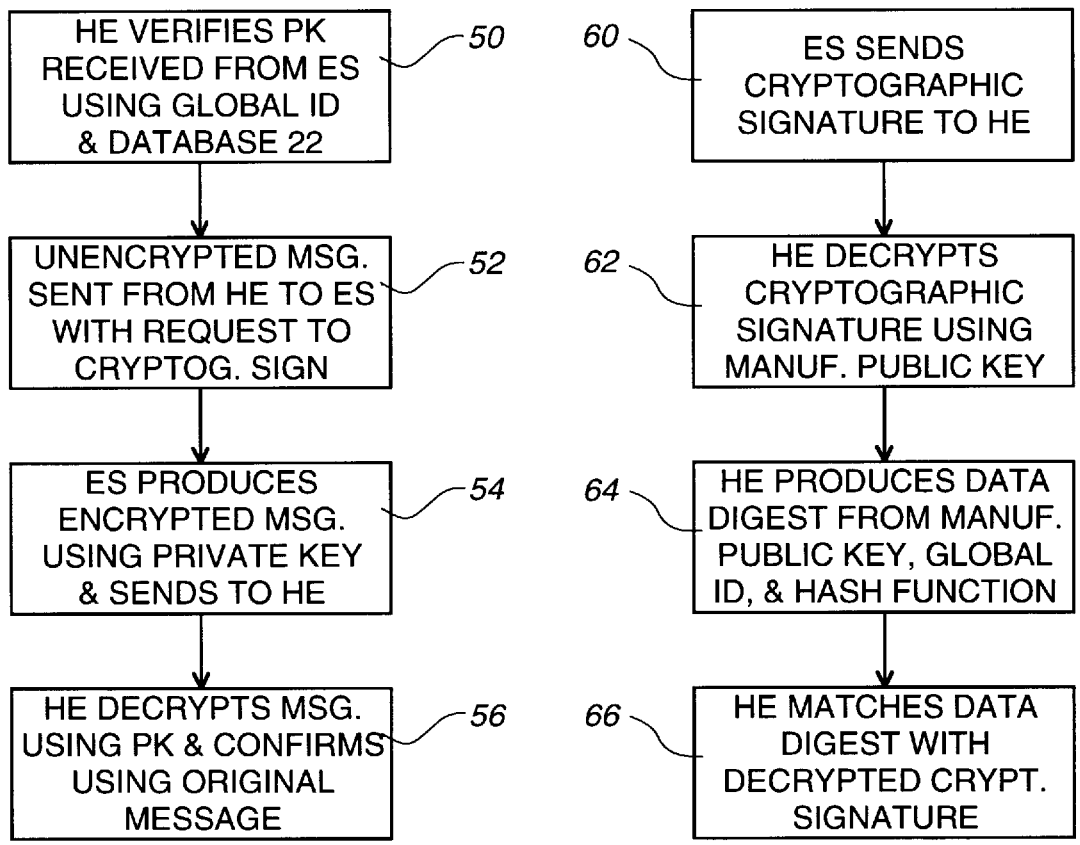
FIGS. 3 and 4 are flow charts illustrating optional authentication steps of the method illustrated by FIG. 2.

Alternatively, or in addition, as illustrated by blocks 52, 54, and 56 in FIG. 3, the optional end station authentication step of block 40 can comprise the step of the head end sending (block 52) an unencrypted message to the end station 12 with a request that it be cryptographically signed. In accordance with this request, the end station 12 produces a digest of the message using a known hashing function (thereby reducing the data to be encrypted), encrypts (block 54) this digest in accordance with its private key, and sends the encrypted message digest to the head end 16. The head end 16 then, at the block 56, decrypts this in accordance with the public key of the end station, retrieved from the database 22, to confirm the digest of its original message which the head end also produces using the hashing function.

It can be seen that, alternatively, the steps represented by the blocks 39 and 40 in FIG. 2 could be replaced by a single step in which the head end 16 determines the public key of the end station 12 from the database 22 in accordance with the global ID of the end station 12 supplied in the dialog 31, without any authentication of the end station or any communication of the public key from the end station 12.

The above sequences provide a particularly strong or secure authentication of the end station 12. For the end station 10 which does not have its own public and private keys, a weaker but still valuable authentication can be provided as shown by the block 38 and in more detail by blocks 60, 62, 64, and 66 if FIG. 4. The authentication block 38 is shown in FIG. 2 as the final block in the process because this enables the exchange of data in the authentication process to be encrypted in accordance with the working key, but this authentication step could alternatively be provided anywhere else in the sequence of steps from the blocks 31 to 37.

For this optional authentication step, the end station 10 is manufactured (e.g. hard wired) with not only its global ID, but also a cryptographic signature as shown in FIG. 1. Conveniently, the end station 10 is manufactured with a certificate comprising data including the global ID of the end station and the public key of the manufacturer and a cryptographic signature comprising an encryption, in accordance with the private key of the manufacturer, of a digest of that data produced using a known hashing function. The public key of the manufacturer can also or instead be stored in the database 22. The optional end station authentication step of the block 38 comprises a communication (block 60) of the cryptographic signature from the end station 10 to the head end 16 (as explained above this could be a part of the dialog 31 or any later step, but the encryption after the block 37 obstructs public observation in the network of cryptographic signatures). The head end 16 then confirms the authenticity of the end station 10 by decrypting (block 62) the cryptographic signature using the manufacturer's public key, producing a digest (block 64) from the same data (global ID and public key, both of which can be communicated in the dialog step 31 or later) and the known hashing function, and matching (block 66) these.

This is a relatively weak authentication, in that identical copies of the end station 10, including duplicated data and cryptographic signatures, could operate at different times on the network without this being detected. However, simultaneous operation of two or more such duplicates would be detected by the fact that two or more end stations would be supplying the same global ID which is supposedly unique. Thus even such a weak authentication is valuable especially in detecting illicit large-scale duplication of end stations.

The processes in accordance with the invention as described above provide a number of significant advantages over known configurations. In particular, requirements for secure storage of public and private keys are minimized in the network as a whole, and eliminated for the end stations 10 which can accordingly be provided at relatively lower cost. At the same time, end stations 12 with greater security can be provided, and the head end 16 can operate simultaneously with both types of end station. This, combined with optional authentication of the end stations as described above, enables different degrees of security to be easily provided in the network in accordance with service requirements.

Furthermore, renewal of the working keys at reset is simpler than providing time-based schedules for changing encryption keys, and key exchanges take place only between the head end and the end station which use the keys, thereby enhancing security compared with distribution of keys from a key distribution agent. In addition, all of the data flowing between the head end and any particular end station 10 or 12, between successive resets, can be encrypted using a single working key, thereby simplifying the encryption and decryption processes. However, it is observed that different working keys could be generated, communicated, and used in the same manner as described above for encrypting and decrypting different types of information, or different services, for a single end station 10 or 12.

Although particular embodiments of the invention have been described in detail, it should be appreciated that numerous modifications, variations, and adaptations may be made without departing from the scope of the invention as defined in the claims.

What is claimed is:

1. A method of facilitating secure communications using encryption and decryption processes in a point-to-multipoint distribution network comprising a central station and a plurality of addressable end stations, in which communications from the central station addressed to and intended for a particular end station are delivered via the network to a plurality of end stations, wherein the central station has a public and private key (PPK) of a PPK encryption scheme, at least one of the end stations has an individual public and private key of a PPK encryption scheme, and at least another one of the end stations does not have an individual public and private key of a PPK encryption scheme, comprising the steps of:

(a) determining in communications between the central station and an end station whether the end station has a PPK, if so proceeding with step (b) and if not proceeding with step (c);

(b) at the central station, determining the public key (PK) of the end station, generating a working key (WK) for encryption of communications to the end station, encrypting the WK using the PK of the end station, and commnunicating the encrypted WK to the end station; at the end station, decrypting the WK using the private key of the end station; and proceeding with step (d);

(c) at the end station, determining the public key (PK) of the central station, generating a working key (WK) for encryption of communications from the central station, encrypting the WK using the PK of the central station, and communicating the encrypted WK to the central station; at the central station, decrypting the WK using the private key of the central station; and proceeding with step (d);

(d) using the WK to encrypt at the central station, and to decrypt at the end station, communications from the central station to the end station.

2. A method as claimed in claim 1 wherein each end station has an individual identity (ID) and step (a) includes the step of communicating the ID of the end station to the central station.

3. A method as claimed in claim 2 wherein in step (b) the PK of the end station is determined by the central station from a database using the ID of the end station.

4. A method as claimed in claim 3 wherein step (b) further comprises an end station authentication step comprising the steps of communicating an unencrypted message from the central station to the end station, producing an encrypted message at the end station using the private key of the end station, communicating the encrypted message to the central station, decrypting the message at the central station using the PK of the end station, and comparing the decrypted message with the original message.

5. A method as claimed in claim 4 wherein in step (b) the end station authentication step is carried out before the step of communicating the encrypted WK to the end station.

6. A method as claimed in claim 2 wherein in step (b) the PK of the end station is communicated to the central station from the end station.

7. A method as claimed in claim 6 wherein in step (b) the PK of the end station is verified by the central station from a database using the ID of the end station.

8. A method as claimed in claim 1 wherein in step (b) the PK of the end station is communicated to the central station from the end station.

9. A method as claimed in claim 2 wherein a plurality of end stations which do not have a PPK each have an individual cryptographic signature encrypted using a private key of a predetermined PPK scheme, step (a) or (c) includes the step of communicating the cryptographic signature of the end station to the central station, and step (c) further comprises an end station authentication step comprising, at the central station, decrypting the cryptographic signature using a public key of the predetermined PPK scheme.

10. A method as claimed in claim 9 wherein the individual cryptographic signature comprises an encryption of data derived from the ID of the respective end station.

11. A method as claimed in claim 9 wherein the predetermined PPK scheme uses a private key and a public key of a manufacturer of the end station.

12. A method as claimed in claim 9 wherein the cryptographic signature is communicated to the central station in step (c).

13. A method as claimed in claim 12 and including the steps of encrypting the cryptographic signature at the end station, and decrypting the encrypted cryptographic signature at the central station, using the WK.

14. A method as claimed in claim 1 and further comprising the step of using the WK to encrypt at the end station, and to decrypt at the central station, communications from the end station to the central station.

* * * * *